United States Patent
Chin et al.

(10) Patent No.: US 8,634,383 B2
(45) Date of Patent: Jan. 21, 2014

(54) METHOD AND APPARATUS FOR RESOLVING PAGING MONITORING CONFLICTS IN MULTIMODE WIRELESS EQUIPMENT

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/384,184

(22) PCT Filed: May 7, 2010

(86) PCT No.: PCT/US2010/034087
§ 371 (c)(1),
(2), (4) Date: Jan. 13, 2012

(87) PCT Pub. No.: WO2011/059521
PCT Pub. Date: May 19, 2011

(65) Prior Publication Data
US 2012/0269173 A1    Oct. 25, 2012

Related U.S. Application Data

(60) Provisional application No. 61/261,059, filed on Nov. 13, 2009.

(51) Int. Cl.
*H04W 4/00* (2009.01)
(52) U.S. Cl.
USPC ........................................................ 370/331
(58) Field of Classification Search
USPC .......... 370/332, 350; 455/436, 437, 443, 448, 455/458
See application file for complete search history.

(56) References Cited

U.S. PATENT DOCUMENTS 6,282,178 B1    8/2001  Noerpel et al.
8,175,621 B2 *  5/2012  Hsu .............................. 455/458
(Continued)

FOREIGN PATENT DOCUMENTS

CN    201048457 Y    4/2008
CN    101176360 A    5/2008
(Continued)

OTHER PUBLICATIONS

WCDMA for UMTS 3rd Edition, Holma and Toskala editors, John Wiley and Son Ltd., West Sussex England, 2004.*
(Continued)

*Primary Examiner* — Mark Rinehart
*Assistant Examiner* — Kenneth P Hunt
(74) *Attorney, Agent, or Firm* — Kristine U. Ekwueme

(57) ABSTRACT

A multimode wireless access terminal is configured to operate in idle mode while registered with a plurality of radio access technologies, for example, a TD-SCDMA network and a WCDMA network, and monitor paging messages, with a reduced likelihood of paging conflicts and missed calls. If the paging conflict is seen at a particular cell, then a cell reselection to another cell may be utilized to change the cell and avoid the conflict. Because the probability of a paging conflict is small due to the short duration of paging indicator messages, the access terminal may have very infrequent paging indicator monitoring conflicts, and when conflicts actually do occur, it is very likely that the UE will find a neighbor cell without conflict.

28 Claims, 8 Drawing Sheets

(56) References Cited

U.S. PATENT DOCUMENTS

| | | | |
|---|---|---|---|
| 8,265,661 B2* | 9/2012 | Chin et al. | 455/458 |
| 2003/0125073 A1* | 7/2003 | Tsai et al. | 455/552 |
| 2005/0048982 A1* | 3/2005 | Roland et al. | 455/449 |
| 2008/0261628 A1 | 10/2008 | Proctor et al. | |
| 2009/0088160 A1* | 4/2009 | Pani et al. | 455/436 |
| 2009/0215472 A1* | 8/2009 | Hsu | 455/458 |
| 2009/0215473 A1* | 8/2009 | Hsu | 455/458 |
| 2010/0255843 A1* | 10/2010 | Huang et al. | 455/436 |
| 2012/0275448 A1* | 11/2012 | Chin et al. | 370/342 |

FOREIGN PATENT DOCUMENTS

| | | | |
|---|---|---|---|
| EP | 1940121 A2 | 7/2008 | |
| TW | 200806054 A | 1/2008 | |
| TW | 200937919 A | 9/2009 | |

OTHER PUBLICATIONS

3GPP TS 03.22 V8.7.0 (Aug. 2002).*

Catt: "The collision handling of paging for CSFB procedure" 3GPP Draft; CI-092118, 3rd Generation Partnership Project (3GPP), Mobile Competence Centre ; 650, Route Des Lucioles ; F-06921 Sophia-Antipolis Cedex ; France, No. Sophia Antipolis (France); 20090427, Apr. 27, 2009, XP050337650 [retrieved on Apr. 27, 2009].

International Search Report and Written Opinion—PCT/US2010/034087, International Search Authority—European Patent Office—Sep. 6, 2010.

Taiwan Search Report—TW099115016—TIPO—Mar. 12, 2013.

* cited by examiner

METHOD AND APPARATUS FOR RESOLVING PAGING MONITORING CONFLICTS IN MULTIMODE WIRELESS EQUIPMENT

CROSS-REFERENCE TO RELATED APPLICATION(S)

This application claims the benefit of U.S. Provisional Patent Application No. 61/261,059, entitled "SYSTEM AND METHOD FOR RESOLVING PAGING MONITORING CONFLICTS IN MULTIMODE WIRELESS EQUIPMENT", filed on 13 Nov. 2009, which is expressly incorporated by reference herein in its entirety.

BACKGROUND

1. Field

Aspects of the present disclosure relate generally to wireless communication systems, and more particularly, to paging systems in multimode wireless communications systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, various providers in China are pursuing WCDMA and/or TD-SCDMA as the underlying air interfaces in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Various aspects of the instant disclosure enable a multimode UE to operate in idle mode while registered with a plurality of radio access technologies (RATs), for example, a TD-SCDMA network and a WCDMA network, and monitor paging messages, with a reduced likelihood of paging conflicts and missed calls. If the paging conflict is seen at a particular cell, then a cell reselection to another cell may be utilized to change the cell and avoid the conflict. Because the probability of a paging conflict is small due to the short duration of paging indicator messages, (e.g., for a TD-SCDMA PICH, $(10+M)/1280 \approx 2\%$ (where M=10 ms, and DRX_cycle=1280 ms)), the UE may have very infrequent paging indicator monitoring conflicts, and when conflicts actually do occur, it is very likely that the UE will find a neighbor cell without conflict. Further, because the system frame number SFN of WCDMA/TD-SCDMA networks are asynchronous, it is likely that a new cell with no PICH monitoring conflict will be found.

In an aspect of the disclosure, a method of wireless communication includes determining the existence of a paging conflict between a first cell of a first network and a second cell of a second network, determining at least one candidate cell in one of the first network or the second network to avoid the paging conflict, and performing a cell reselection from one of the first cell or the second cell to the candidate cell.

In another aspect of the disclosure, an apparatus for wireless communication includes means for determining the existence of a paging conflict between a first cell of a first network and a second cell of a second network, means for determining at least one candidate cell in one of the first network or the second network to avoid the paging conflict, and means for performing a cell reselection from one of the first cell or the second cell to the candidate cell.

In yet another aspect of the disclosure, a computer program product includes a computer-readable medium having code for determining the existence of a paging conflict between a first cell of a first network and a second cell of a second network, determining at least one candidate cell in one of the first network or the second network to avoid the paging conflict, and performing a cell reselection from one of the first cell or the second cell to the candidate cell.

In yet another aspect of the disclosure, an apparatus for wireless communication includes at least one processor and a memory coupled to the at least one processor, wherein the at least one processor is configured to determine the existence of a paging conflict between a first cell of a first network and a second cell of a second network, determine at least one candidate cell in one of the first network or the second network to avoid the paging conflict, and perform a cell reselection from one of the first cell or the second cell to the candidate cell.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
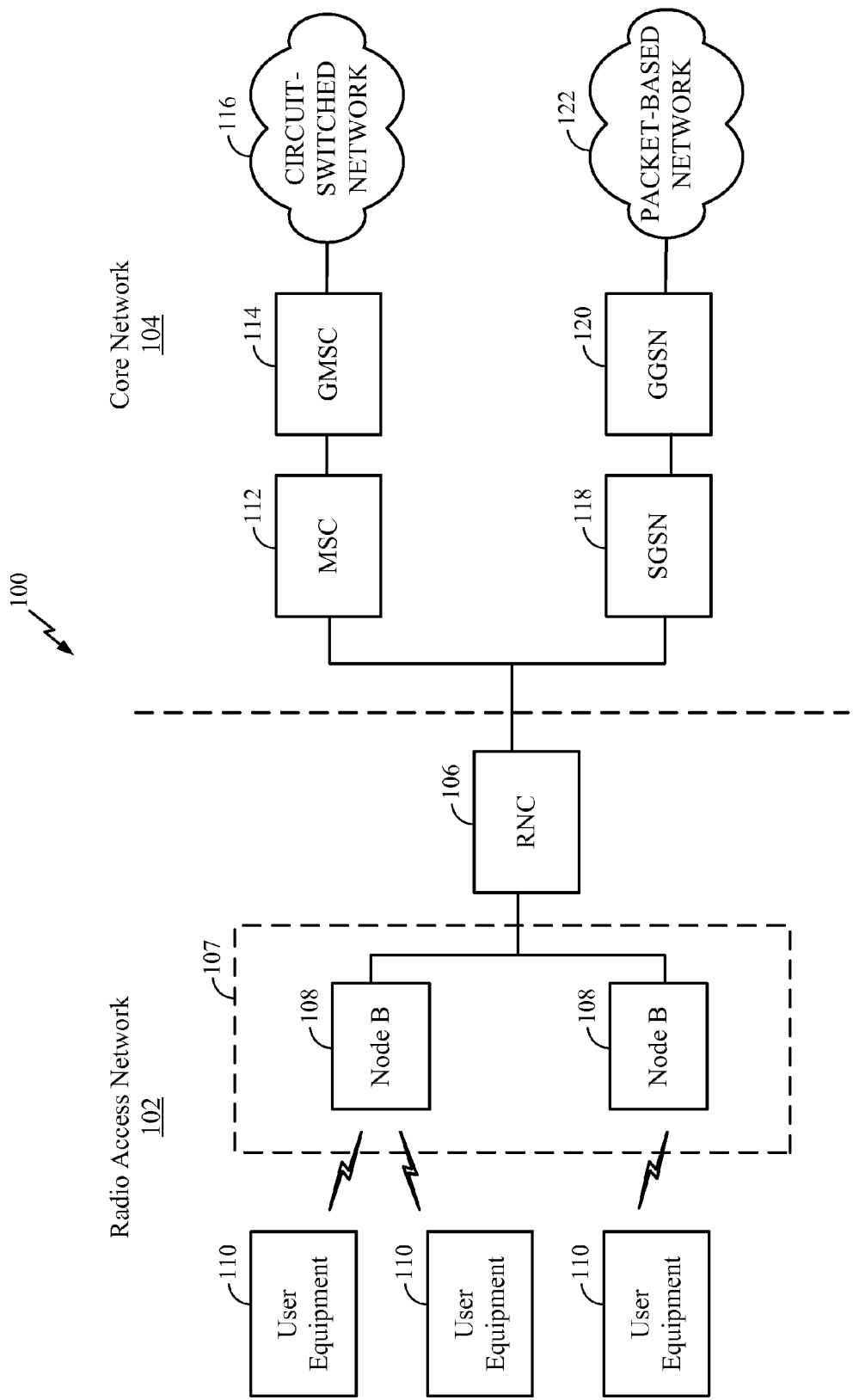
FIG. 1 illustrates a multiple access wireless communication system according to an aspect of this disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. However, those skilled in the art will comprehend that the same or similar functions and blocks may be utilized in a UMTS system employing a WCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/WCDMA systems. TDD uses the same carrier frequency for both the uplink (UL) and downlink (DL) between a Node B 108 and a UE 110, but divides uplink and downlink transmissions into different time slots in the carrier.

Figure 2:
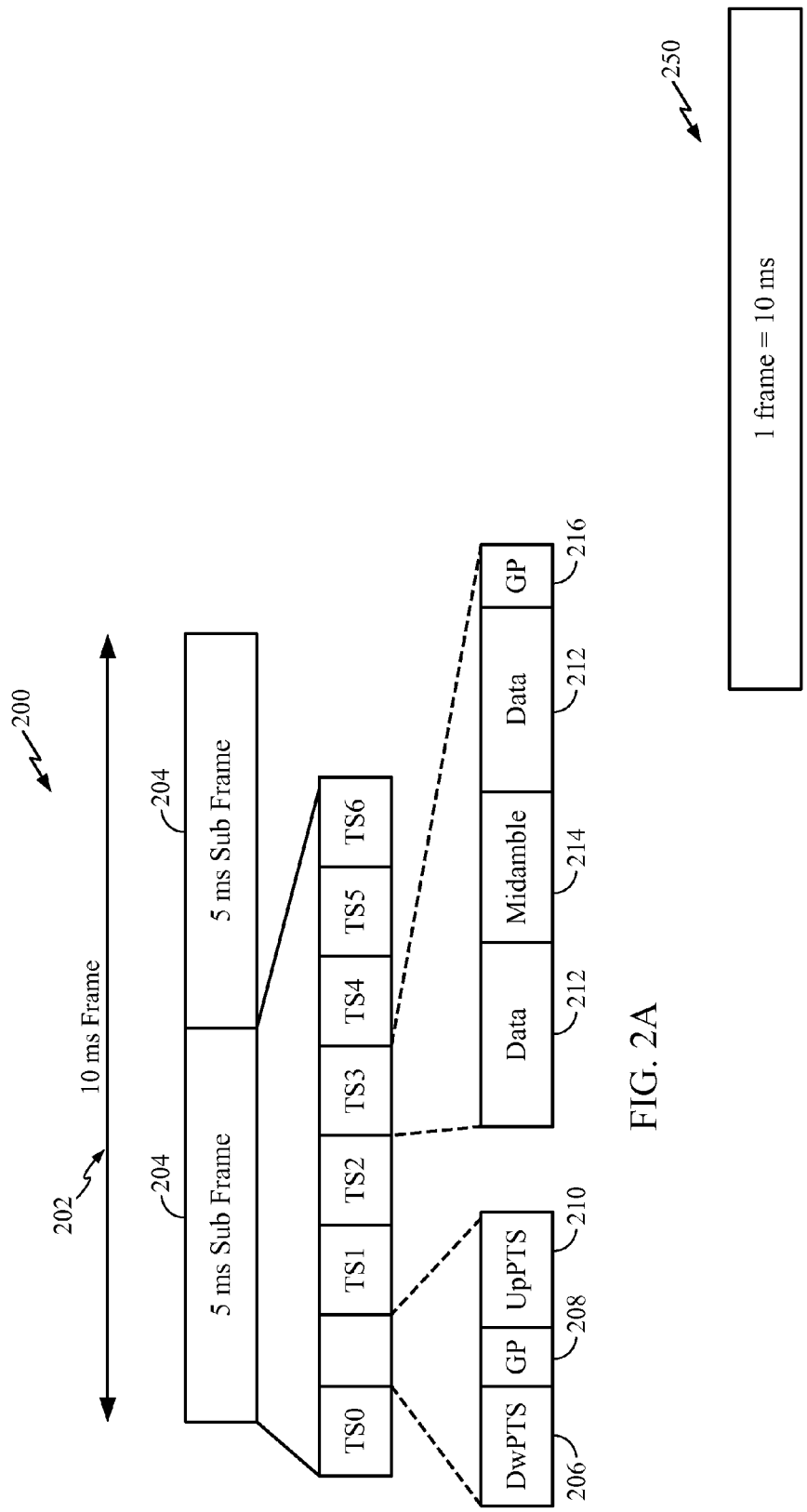
FIG. 2A is a schematic illustration a TD-SCDMA frame structure.
FIG. 2B is a schematic illustration of a W-CDMA frame structure.

FIG. 2A shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

FIG. 2B shows a frame structure for a WCDMA carrier. The WCDMA carrier, as illustrated, has a frame 250 that is 10 ms in length. The content of the frame 250, and the content of each frame, depends on the channel in question, be it a paging channel (PCH), broadcast channel (BCH), random access channel (RACH), etc.

Figure 3:
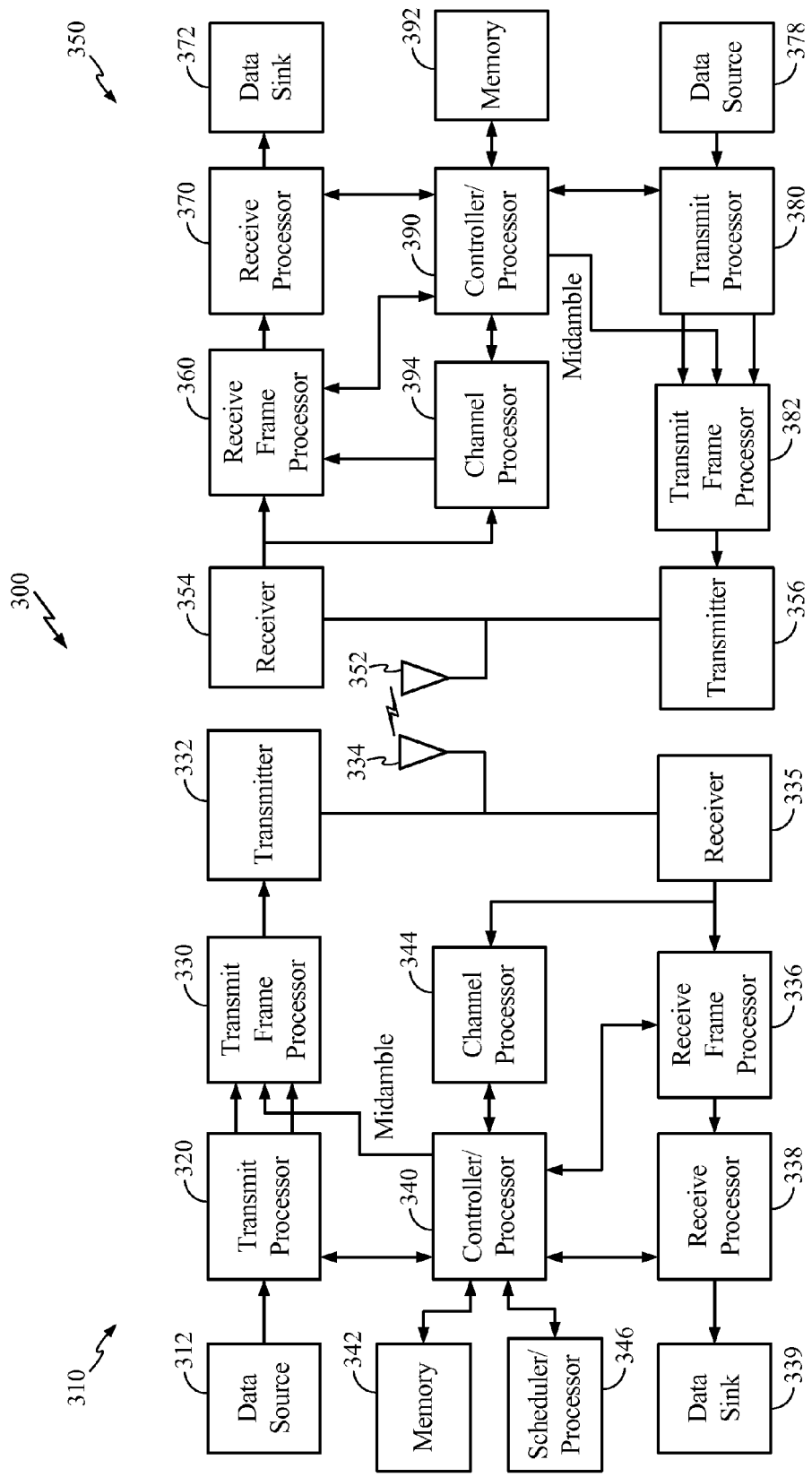
FIG. 3 is a block diagram of a Node B in communication with a UE according to an aspect of this disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2A) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2A) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2A) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2A) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2A) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Details below relate to a scenario illustrated in FIG. 4, which is a conceptual diagram illustrating a network topology in which a UE 410 is an area of geographical coverage of two different wireless networks, that is, a first network 420 utilizing a TD-SCDMA air interface, overlaid with a second network 430 utilizing a WCDMA air interface. The UE 410 may be a multimode terminal capable of wireless communication utilizing more than one air interface. For example, here, the UE may be capable of utilizing both the first network 420 over the TD-SCDMA air interface and the second network 430 over the WCDMA air interface.

As will be discussed in further detail, the example that includes TD-SCDMA and WCDMA is intended only to be illustrative in nature, and in various aspects of the disclosure, the multimode UE may be in an area of geographical coverage of two or more of any number of wireless networks, including but not limited to TD-SCDMA, WCDMA, CDMA2000, 3GPP LTE, and LTE advanced networks.

Figure 4:
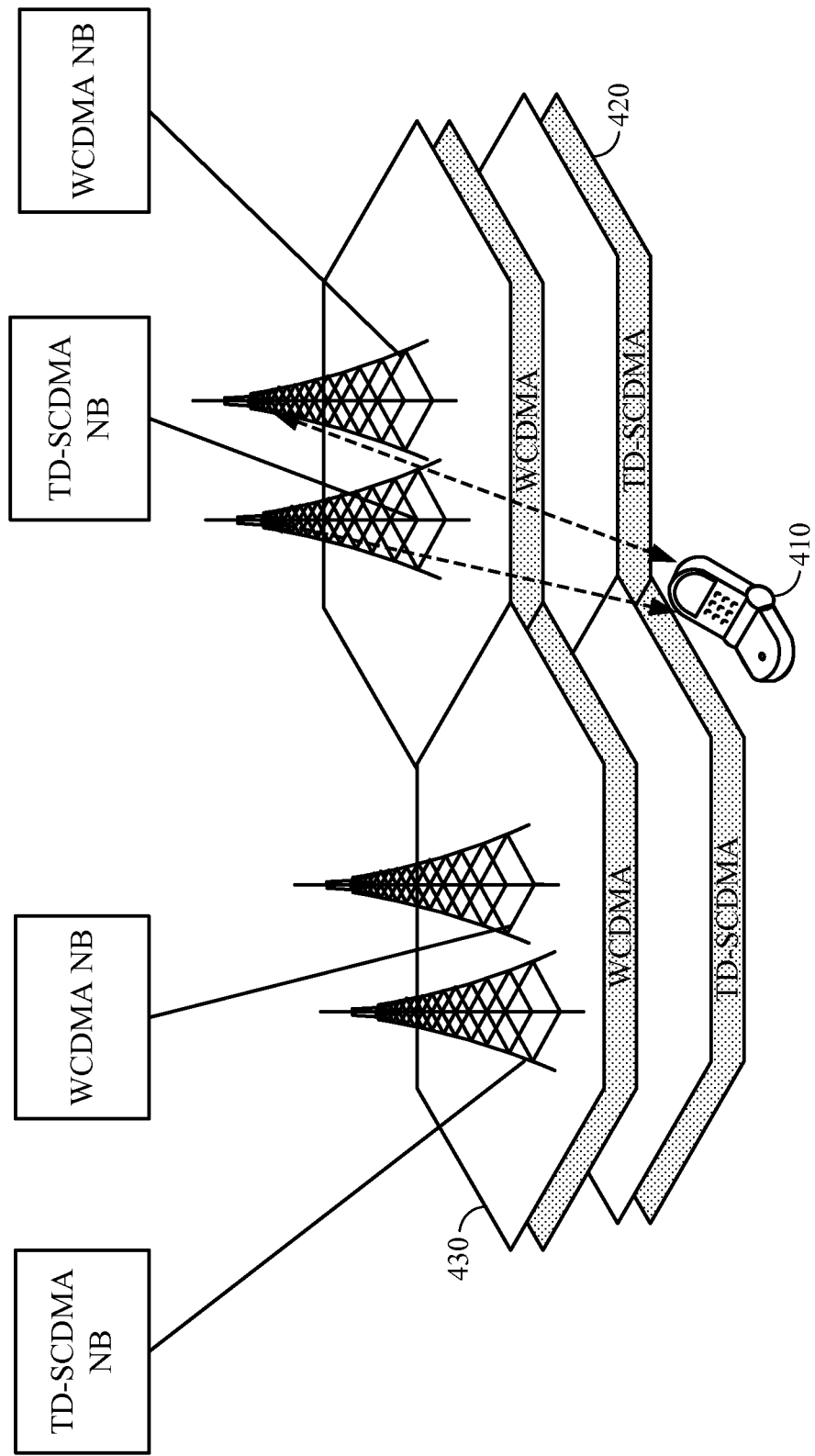
FIG. 4 is a schematic illustration of WCDMA cells overlapping with TD-SCDMA cells.

Returning to the scenario illustrated in FIG. 4, it is possible that the respective core networks of these radio access technologies (RATs) do not communicate with one another, and the multimode UE 410 may subscribe independently with both networks. That is, the UE 410 may have two independent subscriber identity modules (SIMs): one SIM with each of the networks 420, 430, and may register to both networks in order to receive the respective paging message to receive a mobile terminated call while in idle mode. While subscribed, the multimode UE 410 may enter an idle mode in both networks, and may further monitor paging messages of both networks while in idle mode, as discussed in further detail below.

To monitor the respective paging messages, the multimode UE 410 may have a hybrid configuration. That is, the UE may periodically switch between the WDMA network 430 and the TD-SCDMA network 420, to check the paging messages. This may occur when the multimode UE 410 is capable of transmitting to or receiving from one RAT at a time. For example, the multimode UE 410 may include one single RF chain, or the multimode UE 410 may have limited processing power.

Figure 5:
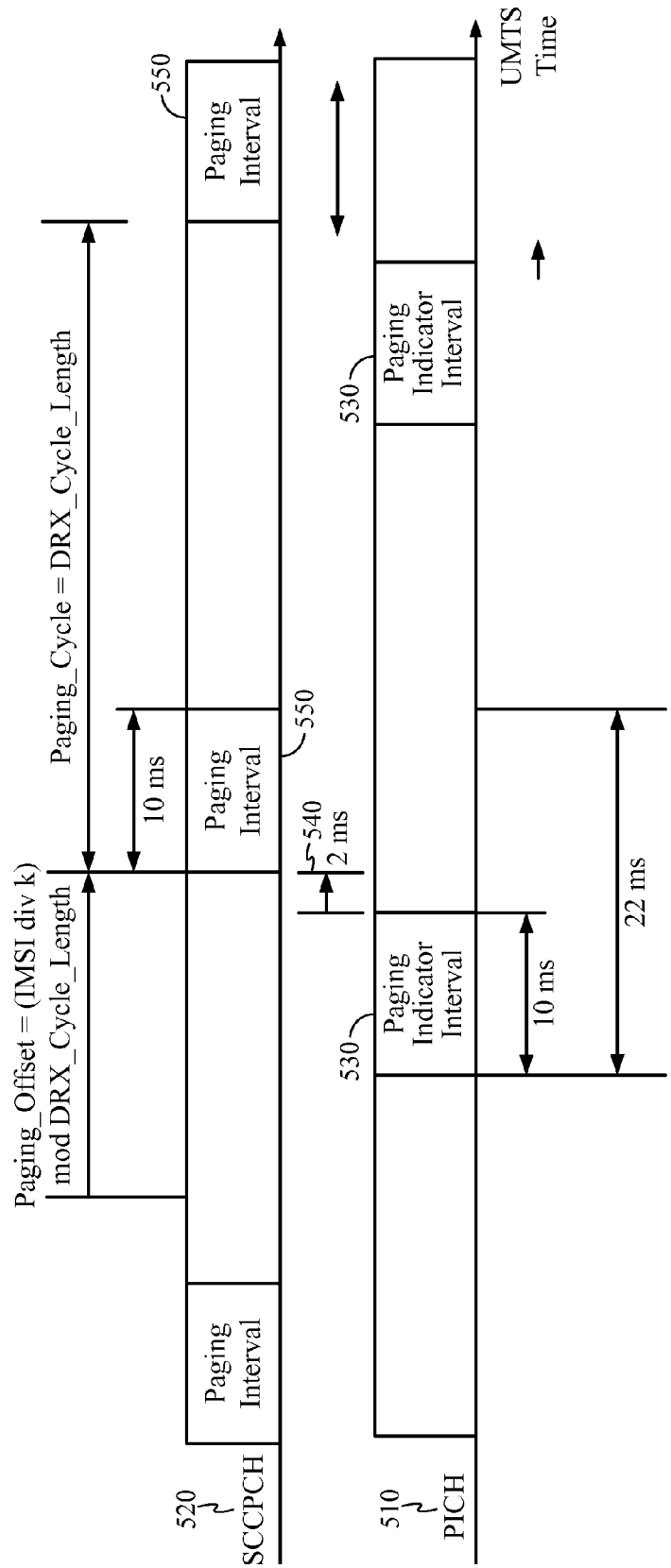
FIG. 5 is a timing diagram illustrating paging intervals in a WCDMA network.

FIG. 5 is a timing diagram conceptually illustrating a paging cycle in a WCDMA RAT. In WCDMA, a paging indicator channel (PICH) 510 is utilized on the downlink to indicate to a UE that a paging message may be found in a paging channel (PCH). The PCH is provided on a secondary common control physical channel (S-CCPCH) 520. That is, the UE in idle mode generally listens to the PICH at certain recurrent paging indicator intervals 530, monitoring the PICH 510 for, e.g., as long as 10 ms. There may be a 2 ms delay 540 between the end of the paging indicator interval 530 on the PICH 510 and the beginning of the paging interval 550 on the S-CCPCH 520, in order to provide time for the UE to switch to the S-CCPCH 520. That is, when the UE finds the appropriate paging indicator on the PICH 510, it may, after a 2 ms delay 540, thereafter monitor the S-CCPCH 520 for a 10 ms paging interval 550, where a Paging Type 1 message is sent, to determine whether the network is initiating communication with the UE.

In WCDMA, different paging cycles may be configured with different paging offsets determined at least in part by an International Mobile Subscriber Identity (IMSI) stored in the SIM in the UE, or by the telephone number, etc. That is, although the paging cycle may be fixed in certain examples, the offset from the beginning of the period may vary from device to device depending on the IMSI or the telephone number. As a simplified example, if a paging cycle corresponds to 128 WCDMA frames, and the paging offset were three frames, then the paging interval would occur in frame numbers 131, 259, 387, etc.

Thus, Equation (1) below may be utilized to determine a system frame number (SFN) corresponding to the paging occasion in which the WCDMA Node B (NB) sends a paging message to the UE:

$$\text{paging\_occasion\_wcdma} = (\text{IMSI div } K) \bmod \text{DRX\_cycle\_wcdma} + i^* \text{DRX\_cycle\_wcdma} \quad (1)$$

The Discontinuous Reception (DRX) Cycle Length may determine the paging cycle length. For example, for circuit switched (CS) service, the DRX Cycle Length may be a number of 10 ms radio frames, the number of frames being determined by the core network with possible values including: $2^6$ (i.e., 640 ms), $2^7$, $2^8$, and $2^9$ (i.e., 5.12 sec). For packet-switched (PS) service, the DRX Cycle Length may be negotiated between UE and the core network using an Attach procedure, known to those skilled in the art, with possible values including: $2^3$ (i.e., 80 ms), $2^4$, $2^5$, $2^6$, $2^7$, $2^8$, and $2^9$ (5.12 sec).

The parameter K corresponds to the number of S-CCPCHs (up to 16) that a NB supports. The operator "div" means the quotient of the division. The parameter i corresponds to an integer.

Different WCDMA NBs may utilize different respective SFNs (e.g., corresponding to a 12-bit radio frame number, from 0 to 4095), and therefore, the paging intervals for different UMTS base stations can be different in absolute time. Moreover, the frame boundaries (i.e., the absolute time when frames from respective ones of the NBs begin and end) generally are not synchronized from one WCDMA NB to another WCDMA NB.

Figure 6:
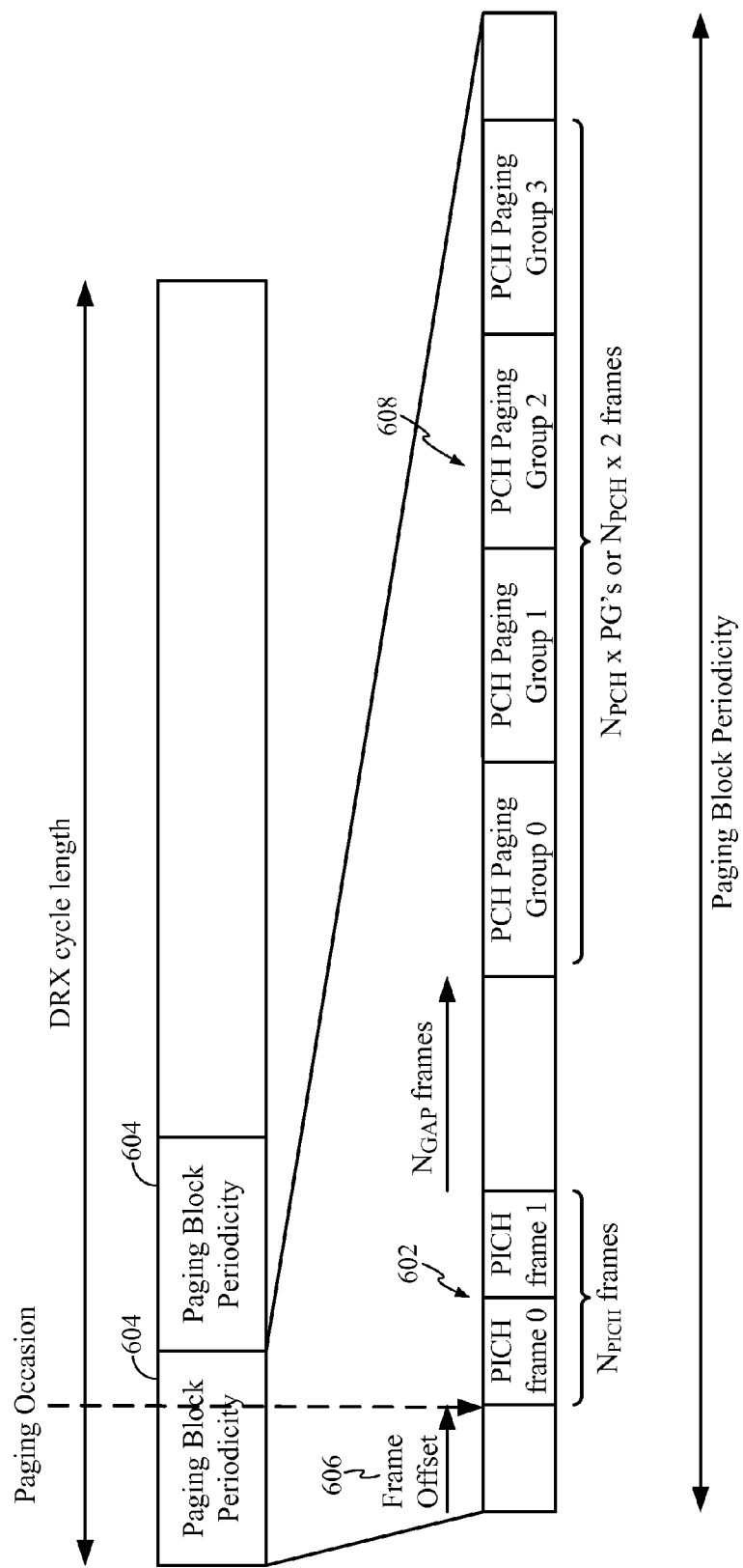
FIG. 6 is a timing diagram illustrating paging intervals in a TD-SCDMA network.

FIG. 6 is a timing diagram conceptually illustrating a paging cycle in a TD-SCDMA RAT. In TD-SCDMA, a UE configured for idle mode discontinuous reception (DRX) operation may listen to certain recurrent paging blocks of a paging indicator channel (PICH) 602. The DRX cycle may be determined by a circuit switched core network (CN) provided by a higher layer communication, e.g., in a system information message, or may be negotiated between the packet switched CN and the UE. The final DRX cycle length may be the shortest of the circuit switched CN and the packet switched CN.

The UE may then listen to the PICH 602 starting with the associated paging_occasion_td, given by Equation (2). That is, Equation (2) below may be utilized to determine a SFN corresponding to the paging occasion in which the TD-SCDMA NB sends a paging message to the UE:

$$\text{paging\_occasion\_td} = (\text{IMSI div } K) \bmod (\text{DRX\_cycle\_td div PBP})^* \text{PBP} + \text{frame\_offset} + j^* \text{DRX\_cycle\_td} + p \quad (2)$$

The paging block periodicity (PBP) 604 corresponds to the number of frames between two sequential paging blocks, and the frame offset corresponds to the frame offset 606 of the first frame in the PBP 604, given in the system information message. K corresponds to the number of secondary common control physical channels (S-CCPCHs) that may carry a paging channel (PCH). The parameter j corresponds to an integer. The parameter p is defined below in Equation (3).

During each PBP 604, there may be a PICH 602 for $N_{PICH}$ frames, and there may be a PCH 608 with $N_{PCH}*2$ frames. Further, there may be $N_{GAP}$ frames from the end of the PICH to the beginning of the PCH 608. The UE may be assigned to one of the $N_{PICH}$ frames in the PICH block 602, and one of the $N_{PCH}$ paging groups (e.g., each paging group PG having 2 frames) in the PCH 608, which corresponds to the associated paging occasion. When a paging message corresponding to that particular UE is determined to be within the PCH paging group, it indicates that the network is initiating communication with that UE.

The parameters $N_{PICH}$, $N_{GAP}$, and $N_{PCH}$ may be determined based on system information.

The UE may only listen to one specific frame p of the PICH 602 in accordance with Equation (3):

$$p = [(IMSI \text{ div } 8192) \text{mod}(N_{PICH} * NPI)] \text{div } NPI \quad (3)$$

The NPI is the number of paging indicators per frame in the PICH 602, and it may be derived from system information.

Therefore, the UE may only select one frame of the paging block per DRX_cycle to monitor the PICH 602. That is, the UE may only monitor the PICH frame at:

$$\text{paging\_occasion\_td} + p \quad (4)$$

In distinction to WCDMA frames, from the timing perspective, the TD-SCDMA frame boundaries may be synchronized or aligned for different NBs, but the system frame number (SFN) generally may be unsynchronized or non-aligned for different NBs.

However, as the multimode terminal may monitor paging indication messages (e.g., the PICH 602 or the Paging Indicator 530) in both WCDMA and TD-SCDMA networks, there may be a time when the paging monitoring for the WCDMA network and the paging monitoring for the TD-SCDMA network conflict. That is, because a multimode UE may only be capable of receiving from one network at a time, the UE may only choose one network to monitor, and therefore, it may miss some paging messages from the other network. Further, because the paging intervals in both networks are recurring, and may be periodic, it is likely that if one paging indication conflict occurs, then the paging conflicts will recur again and again, causing a significant issue of missing calls, SMS messages, and the like.

Thus, in an aspect of the instant disclosure, a paging conflict may be avoided by detecting the paging conflict condition, finding and selecting a neighboring cell in which the paging conflict will not occur, and performing a cell reselection to the selected cell, thus monitoring the paging indicator channel (and thereafter, the paging channel, depending on the RAT) from the reselected cell. That is, the UE may utilize both the WCDMA and TD-SCDMA networks as per normal procedures until a paging conflict occurs or is predicted to occur. When a paging conflict is detected, the below-described process may be utilized to execute a cell reselection of one or both base stations in an attempt to avoid the conflict. Here, a cell reselection may include an idle handover to the neighbor cell, or any suitable process of acquiring a neighbor cell to avoid a paging conflict.

A paging conflict may exist when a conflict actually occurs, i.e, when a paging indicator message is detected as being simultaneously received by the UE over both networks. In an aspect of the disclosure, the UE may preemptively check for conflicts in the future based on measurements of the timing of the paging indicator messages on the respective RATs. That is, before an actual conflict occurs (i.e., during a time when paging indicator message is not being simultaneously received from both networks, but when such a condition is predicted to occur), the UE may utilize the below-described process as a preventative measure in an attempt to prevent a paging conflict from occurring. Thus, in the remainder of this disclosure, when reference is made to a paging conflict, it may refer to a time when a conflict is presently occurring, and/or when a conflict is predicted to occur in the future.

Figure 7:
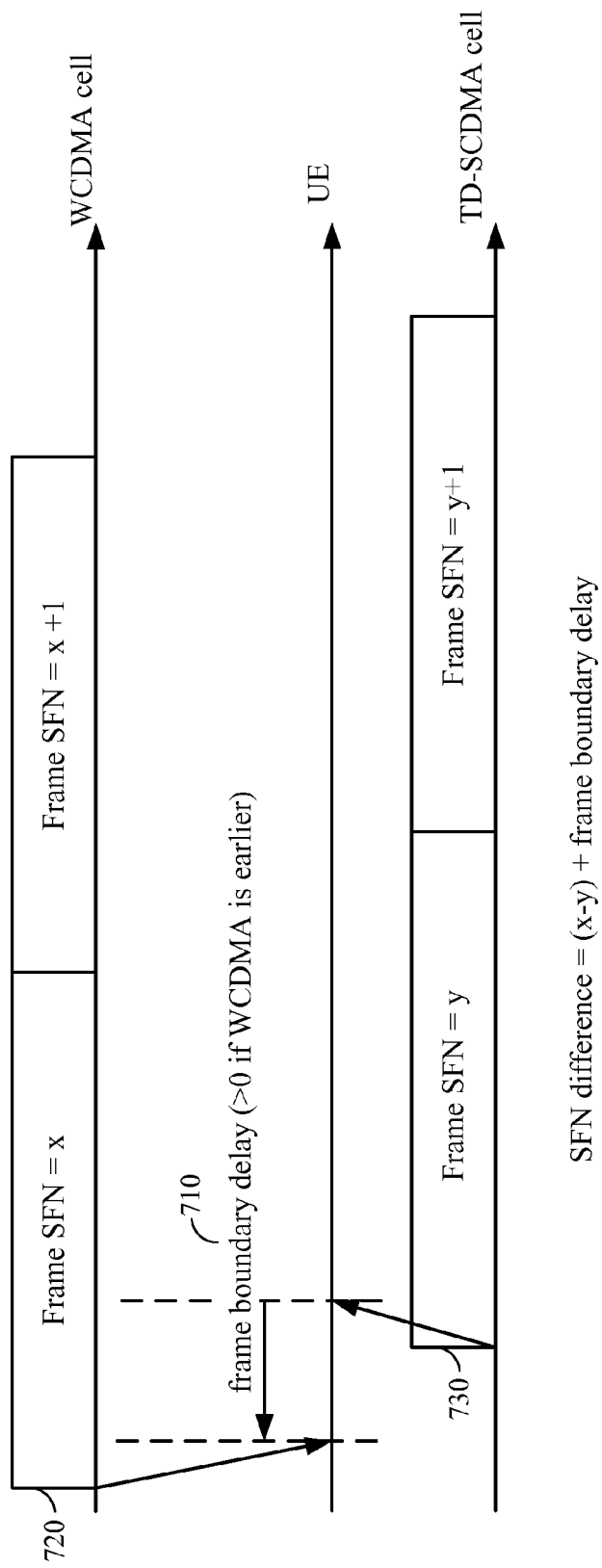
FIG. 7 is a timing diagram illustrating overlapping frames in a WCDMA network and a TD-SCDMA network.

In an aspect of the instant disclosure, a multimode UE may measure the time difference between a SFN corresponding to a paging occasion for a WCDMA network to which it is registered, relative to that of a TD-SCDMA network to which it is registered. In one example, illustrated schematically by the timing diagram in FIG. 7, the SFN time difference is measured by the SFN "x" in the WCDMA cell minus the SFN "y" in the TD-SCDMA cell, plus the frame boundary delay 710. Here, the frame boundary delay 710 is positive if the WCDMA frame boundary 720 is received earlier than the TD-SCDMA frame boundary 730.

The shorter cycle of the two technologies (i.e., DRX_cycle) is defined as shown below in Equation (5):

$$\text{DRX\_cycle} = \min\{\text{DRX\_cycle\_td, DRX\_cycle\_wcdma}\} \quad (5)$$

An arbitrary paging occasion is chosen in both systems, and the time difference D between the time instances is calculated to monitor PICH, as shown below in Equation (6):

$$D = (\text{paging\_occasion\_wcdma} - 12 \text{ ms} - \text{paging\_occasion\_td} - p*10 \text{ ms} - \text{SFN difference}) \text{mod DRX\_cycle} \quad (6)$$

The 12 ms element appears in Equation (6) because the beginning of the WCDMA PICH leads the beginning of the PCH by 12 ms (see FIG. 5). The factor p*10 ms appears in Equation (6) because the UE only monitors frame number p of the PICH.

Thus, the condition in which there is a conflict in PICH monitoring is given by Equation (7):

If $0 \leq D < 10 \text{ ms} + M$ or $$\text{DRX\_cycle} - 10 \text{ ms} - M < D \leq \text{DRX\_cycle} \quad (7)$$

Here, M is a margin to allow time for RF tuning, acquisition, etc., in order to decode the paging information in switching the RAT. 10 ms may be the maximum time offset between the PICH frames of two RATs with a conflict in PICH monitoring.

In an aspect of the instant disclosure, if a conflict condition exists in the paging monitoring of two different networks, as according to Equation (7), a process includes seeking and switching to a different NB for at least one of the networks to avoid the conflict. This process takes advantage of the likelihood that, in a WCDMA RAT, for example, the frame number at which a paging indicator message is sent, is different for different NBs.

Those skilled in the art may notice that, if frames were aligned and the frame numbers were synchronized, that is, the same on all the NBs, the conflict condition may still exist even after handing over to the other base station. However, here, even if the frame number at which a paging indicator message were sent were the same at two different base stations (e.g., 131, 259, etc., as given in the simplified example above), the frames are still unlikely to be synchronized. That is, for different WCDMA base stations, the frame numbers are generally not synchronized. For example, if a first base station is transmitting frame number 10 at time t, then a second base station may be transmitting frame number 50 at time t. Thus, even if the paging indicator occurs on the same frame schedule, it may still occur at a different absolute time at different base stations.

The process includes seeking candidate cells without the paging conflict condition. The candidate cells should have a signal characteristic, such as a signal power, a signal to interference ratio, or any other suitable characteristic, that exceeds a threshold, e.g., a minimum value (or a maximum value, as appropriate for the particular characteristic), prior to considering switching to those cells. Options include changing the WCDMA cell, changing the TD-SCDMA cell, or changing both the WCDMA and the TD-SCDMA cells. The final decision of which cell to choose for the cell reselection may be based on which one has the best signal characteristics out of the candidate cells, for example, the cell with the highest power.

As mentioned above, the detailed description herein provides details related to a multimode UE in overlapping TD-SCDMA and WCDMA networks. However, those skilled in the art will comprehend that the process described herein may be applied to other scenarios as well, within the spirit and scope of this disclosure. For example, the concepts illustrated rely on the situation wherein, in a TD-SCDMA network, while the frame boundaries may be synchronized or aligned for different NBs the SFN generally may be unsynchronized or non-aligned for different NBs; and in a WCDMA network, neither the frame boundaries nor the SFNs are generally synchronized or aligned for different NBs. Thus, the cell reselection may take place in either network, as detailed below.

However, those skilled in the art will comprehend that in a CDMA2000 network, the timing of the frames may be substantially synchronized for different base stations, and thus, a multimode UE would generally not benefit from performing a cell reselection to a different CDMA2000 base station. That is, for a multimode UE subscribed to a TD-SCDMA network and a CDMA2000 network, a cell reselection may be performed for the TD-SCDMA network. Similarly, for a multimode UE subscribed to a WCDMA network and a CDMA2000 network, a cell reselection may be performed for the WCDMA network. For a multimode UE subscribed to a TD-SCDMA network, a WCDMA network, and a CDMA2000 network, a cell reselection may be performed for one or both of the TD-SCDMA network and/or the WCDMA network.

Finally, those skilled in the art will comprehend that an LTE network exhibits similar non-alignments between paging indication frames for different enhanced NBs (eNB), and thus, for a multimode UE subscribed to any 3G network (e.g., TD-SCDMA, WCDMA, CDMA2000, etc.) and an LTE network, a cell reselection may be performed for the TD-SCDMA network, the WCDMA network, and/or the LTE network, as appropriate.

Figure 8:
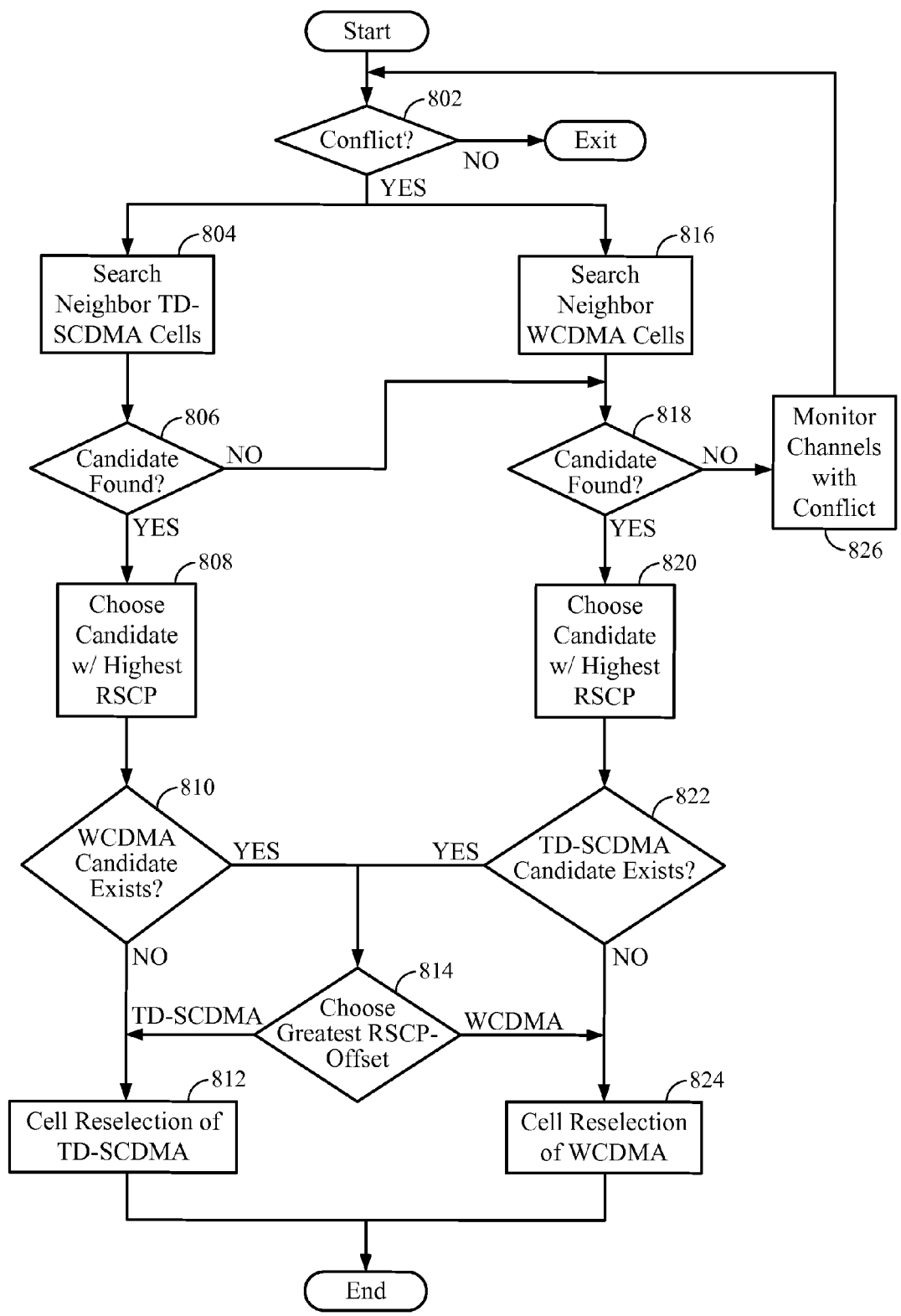
FIG. 8 is a flow chart illustrating a process according to an aspect of this disclosure.

In more detail, an exemplary process for avoiding a paging conflict condition according to an aspect of the disclosure is illustrated in FIG. 8. Although details are provided with an assumption that a multimode UE is registered with a TD-SCDMA RAT and a WCDMA RAT, those skilled in the art will comprehend that the ideas, concepts, and processes discussed herein may equally be applied to a multimode UE registered with a plurality of any number of RATs, such as, but not limited to, TD-SCDMA, WCDMA, TD-CDMA, CDMA2000, 3GPP LTE, LTE Advanced, etc., as discussed above.

According to an aspect of the disclosure, in block 802, the process determines whether a conflict condition exists in the paging monitoring of the TD-SCDMA RAT and the WCDMA RAT. In one example, the existence of the conflict condition is determined in accordance with equation (7) above. If there is no conflict condition, the process exits, and may begin anew immediately or at a later time.

In various examples of a process according to aspects of the disclosure, the branches of FIG. 8 beginning at block 804 and at block 816 may be performed in conjunction, or in the alternative. In the exemplary process described below, for ease of description, it will be assumed that both branches will be performed in conjunction.

In block 804, the process searches for a candidate cell in the TD-SCDMA network; and in block 806, the process determines whether any candidate cells are found. Here, a candidate cell may include a TD-SCDMA cell that meets one or more cell selection criteria. For example, determining a candidate cell in the TD-SCDMA network may include scanning for a neighboring cell having a received signal code power (RSCP) of a primary common control physical channel (P-CCPCH) for a particular NB being greater than a certain threshold (e.g., Qrxlevmin). For cells that meet this criterion (i.e., RCSP_cell>Qrxlevmin), the UE may measure the SFN difference between the current WCDMA cell relative to the neighbor, potential-candidate TD-SCDMA cell having RCSP_cell>Qrxlevmin, and determine whether equation (7) above is false (i.e., there is no paging conflict condition with the current WCDMA cell). The UE may repeat blocks 804 and 806 until it collects all TD-SCDMA cells meeting these criteria, as potential candidate TD-SCDMA cells for a cell reselection to occur.

If at least one cell is found in block 806 as a potential candidate cell, the process continues to block 808, wherein the process chooses the cell having the highest RSCP to be a TD-SCDMA cell reselection candidate. Candidate cells may be in the same location area as the current cell, or in a different location area. However, if the candidate cell is in a different location area, a cell reselection to the candidate cell, if it occurs, may further include performing a registration with the other location area after performing the cell reselection to the candidate cell.

Returning to block 816, the process searches for a candidate cell in the WCDMA network; and in block 818, the process determines whether any candidate cells are found. Similar to the process described above with respect to the TD-SCDMA network, here, the process looks for potential candidate cells by scanning for neighboring cells having an RSCP of a common pilot channel (CPICH) greater than a certain threshold (e.g., Qrxlevmin), and a signal to noise ratio $E_c/N_0$ greater than another threshold (e.g., Qqualmin), and determining whether equation (7) above is false for those cells (i.e., there is no paging conflict condition with the current TD-SCDMA cell). The UE may repeat blocks 816 and 818 until it collects all WCDMA cells meeting these criteria, as potential candidate WCDMA cells for a cell reselection to occur.

If at least one cell is found in block 818 as a potential candidate cell, the process continues to block 820, wherein the process chooses the cell having the highest RSCP to be a WCDMA cell reselection candidate. Candidate cells may be in the same location area as the current cell, or in a different location area. However, if the candidate cell is in a different location area, a cell reselection to the candidate cell, if it occurs, may further include performing a registration with the other location area after performing the cell reselection to the candidate cell.

If no candidate TD-SCDMA cell was found in block 806, and if no candidate WCDMA cell was found in block 818, then the algorithm has failed to identify an alternative cell for a cell reselection to occur to resolve the paging conflict. In this situation, the process moves to block 826, and performs contention resolution, e.g., monitoring the respective TD-SCDMA and WCDMA paging channels while suffering the standard problems associated with a paging conflict. That is, the UE maintains its registration with the current TD-SCDMA and WCDMA cells and monitors the paging indicator channels with the conflict. Whenever there is an actual conflict, the UE may choose one or the other RAT to listen for its respective paging indicator. However, the process may return to block 802 and continue to search for neighbor cells as described above, until a suitable cell without a paging conflict condition is reselected.

However, if a candidate cell is found in block 808, or block 820, but not both, then the neighbor cell in the corresponding TD-SCDMA network or WCDMA network determined to be the candidate cell is the reselected cell. That is, in block 810, the process has determined a candidate TD-SCDMA cell. If, in block 810, the process determines that no candidate WCDMA cell has been determined, then the process moves to block 812, wherein a cell reselection of the TD-SCDMA cell to the candidate TD-SCDMA cell is performed, thus, avoiding the conflict condition. Similarly, in block 820, the process has determined a candidate WCDMA cell. If, in block 822, the process determines that no candidate TD-SCDMA cell has been determined, then the process moves to block 824, wherein a cell reselection of the WCDMA cell to the candidate WCDMA cell is performed, thus, avoiding the conflict condition.

If a candidate cell is found in both blocks 808 and 820, the process may choose among the candidate cells in the TD-SCDMA or WCDMA networks by selecting the one with the better RSCP, and in some cases, utilizing a power offset value (e.g., RSCP−Offset) for this determination, for the cell reselection to occur. The offset may be helpful because the performance of a WCDMA network and a TD-SCDMA network may be different although their RSCP may be the same. This situation may be determined by field-testing of the respective downlink performance, or by simulation. In some cases, a suitable offset value may be predetermined and pre-set by a UE manufacturer. In some cases, the offset value may be tuned real-time during operation. In other cases, the offset value may not be directly related to the performance of the downlink, but rather, may be related to a business decision, e.g., choosing that a TD-SCDMA network is always preferred over a WCDMA network, even if the RSCP of the WCDMA network is equal to or greater than that of the TD-SCDMA network, up to a certain threshold offset value.

Thus, if the process determines in block 810 that a WCDMA candidate exists in addition to the TD-SCDMA candidate cell determined in block 808; or, if the process determines in block 822 that a TD-SCDMA candidate exists in addition to the WCDMA candidate cell determined in block 820, then the process moves to block 814, in which the respective candidate cell having the greatest value of RSCP−Offset is determined. If the TD-SCDMA candidate cell has the greatest value, the process moves to block 812, wherein a cell reselection to the TD-SCDMA candidate cell is performed. If the WCDMA candidate cell has the greatest value, the process moves to block 824, wherein a cell reselection to the WCDMA candidate cell is performed.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    determining the existence of a paging conflict between a first cell of a first network and a second cell of a second network, the first network being asynchronous and of a first radio access technology (RAT) and the second network is synchronous and of a second RAT;
    determining a first candidate cell in the first network to avoid the paging conflict;
    determining a second candidate cell in the second network to avoid the paging conflict; and
    performing a cell reselection from one of the conflicted cell to the corresponding first candidate cell or second candidate cell selected based at least in part on a power offset comprising a preset value corresponding to a preference of the first network or the second network.

2. The method of claim 1, wherein a signal corresponding to the at least one candidate cell has a signal characteristic above a predetermined threshold.

3. The method of claim 2, wherein the signal characteristic is at least one of a signal power or a signal-to-interference ratio.

4. The method of claim 2, wherein the at least one candidate cell is in the same location area as the first cell when the at least one candidate cell is in the first network.

5. The method of claim 2, wherein, when the at least one candidate cell is not in the same location area as the first cell in the first network, the method further comprises performing registration in a location area corresponding to the at least one candidate cell after the performing of the cell reselection.

6. The method of claim 1, wherein the first network is a WCDMA network, and the second network is a TD-SCDMA network.

7. The method of claim 1, wherein the at least one candidate cell comprises a plurality of cells, and the determining at least one candidate cell comprises selecting the cell from the plurality of cells having the greatest received signal code power.

8. An apparatus for wireless communication, comprising:
    means for determining the existence of a paging conflict between a first cell of a first network and a second cell of a second network, the first network being asynchronous and of a first radio access technology (RAT) and the second network is synchronous and of a second RAT;
    means for determining a first candidate cell in the first network to avoid the paging conflict;
    means for determining a second candidate cell in the second network to avoid the paging conflict; and
    means for performing a cell reselection from one of the conflicted cell to the corresponding first candidate cell or second candidate cell selected based at least in part on a power offset comprising a preset value corresponding to a preference of the first network or the second network.

9. The apparatus of claim 8, wherein a signal corresponding to the at least one candidate cell has a signal characteristic above a predetermined threshold.

10. The apparatus of claim 9, wherein the signal characteristic is at least one of a signal power or a signal-to-interference ratio.

11. The apparatus of claim 9, wherein the at least one candidate cell is in the same location area as the first cell when the at least one candidate cell is in the first network.

12. The apparatus of claim 9, wherein, when the at least one candidate cell is not in the same location area as the first cell in the first network, the apparatus further comprises means for performing registration in a location area corresponding to the at least one candidate cell after the performing of the cell reselection.

13. The apparatus of claim 8, wherein the first network is a WCDMA network, and the second network is a TD-SCDMA network.

14. The apparatus of claim 8, wherein the at least one candidate cell comprises a plurality of cells, and the means for determining at least one candidate cell comprises means for selecting the cell from the plurality of cells having the greatest received signal code power.

15. A computer program product, comprising:
    a non-transitory computer-readable medium comprising code for:
    determining the existence of a paging conflict between a first cell of a first network and a second cell of a second network, the first network being asynchronous and of a first radio access technology (RAT) and the second network is synchronous and of a second RAT;
    determining a first candidate cell in the first network to avoid the paging conflict;
    determining a second candidate cell in the second network to avoid the paging conflict; and
    performing a cell reselection from one of the conflicted cell to the corresponding first candidate cell or second candidate cell selected based at least in part on a power offset comprising a preset value corresponding to a preference of the first network or the second network.

16. The computer program product of claim 15, wherein a signal corresponding to the at least one candidate cell has a signal characteristic above a predetermined threshold.

17. The computer program product of claim 16, wherein the signal characteristic is at least one of a signal power or a signal-to-interference ratio.

18. The computer program product of claim 16, wherein the at least one candidate cell is in the same location area as the first cell when the at least one candidate cell is in the first network.

19. The computer program product of claim 16, wherein, when the at least one candidate cell is not in the same location area as the first cell in the first network, the computer-readable medium further comprises code for performing registration in a location area corresponding to the at least one candidate cell after the performing of the cell reselection.

20. The computer program product of claim 15, wherein the first network is a WCDMA network, and the second network is a TD-SCDMA network.

21. The computer program product of claim 15, wherein the at least one candidate cell comprises a plurality of cells, and the code for determining at least one candidate cell comprises code for selecting the cell from the plurality of cells having the greatest received signal code power.

22. An apparatus for wireless communication, comprising:
   at least one processor; and
   a memory coupled to the at least one processor,
   wherein the at least one processor is configured to: determine the existence of a paging conflict between a first cell of a first network and a second cell of a second network, the first network being asynchronous and of a first radio access technology (RAT) and the second network is synchronous and of a second RAT;
   determining a first candidate cell in the first network to avoid the paging conflict;
   determining a second candidate cell in the second network to avoid the paging conflict; and
   performing a cell reselection from one of the conflicted cell to the corresponding first candidate cell or second candidate cell selected based at least in part on a power offset comprising a preset value corresponding to a preference of the first network or the second network.

23. The apparatus of claim 22, wherein a signal corresponding to the at least one candidate cell has a signal characteristic above a predetermined threshold.

24. The apparatus of claim 23, wherein the signal characteristic is at least one of a signal power or a signal-to-interference ratio.

25. The apparatus of claim 23, wherein the at least one candidate cell is in the same location area as the first cell when the at least one candidate cell is in the first network.

26. The apparatus of claim 23, wherein, when the at least one candidate cell is not in the same location area as the first cell in the first network, the at least one processor is further configured to perform registration in a location area corresponding to the at least one candidate cell after the performing of the cell reselection.

27. The apparatus of claim 22, wherein the first network is a WCDMA network, and the second network is a TD-SCDMA network.

28. The apparatus of claim 22, wherein the at least one candidate cell comprises a plurality of cells, and the determining at least one candidate cell in one of the first network comprises selecting the cell from the plurality of cells having the greatest received signal code power.

* * * * *